United States Patent
Brighenti et al.

(10) Patent No.: US 10,412,595 B2
(45) Date of Patent: Sep. 10, 2019

(54) CAPACITY OPTIMIZATION SUB-SYSTEM FOR DISTRIBUTED ANTENNA SYSTEM

(71) Applicant: Andrew Wireless Systems GmbH, Buchdorf (DE)

(72) Inventors: Samuele Brighenti, Faenza (IT); Massimiliano Mini, Forli (IT)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/912,319

(22) Filed: Mar. 5, 2018

(65) Prior Publication Data
US 2018/0199209 A1    Jul. 12, 2018

Related U.S. Application Data

(63) Continuation of application No. 14/433,341, filed as application No. PCT/EP2012/004179 on Oct. 5, 2012, now Pat. No. 9,913,147.

(51) Int. Cl.
*H04W 16/24*    (2009.01)
*H04W 16/08*    (2009.01)
(Continued)

(52) U.S. Cl.
CPC ............ *H04W 16/24* (2013.01); *H04W 16/08* (2013.01); *H04W 28/0289* (2013.01); *H04W 28/08* (2013.01); *H04W 88/085* (2013.01)

(58) Field of Classification Search
CPC ........... H04W 16/24; H04B 1/00; H04M 3/53
See application file for complete search history.

(56) References Cited

U.S. PATENT DOCUMENTS

| 4,918,684 A | 4/1990 | Boschet et al. |
| 5,353,332 A | 10/1994 | Raith et al. |

(Continued)

FOREIGN PATENT DOCUMENTS

| CN | 101572903 A | 11/2009 |
| CN | 101610135 A | 12/2009 |

(Continued)

OTHER PUBLICATIONS

"Allen Telecom's Radio-Over-Fiber Technology Powers Mobile Communications at Olympics", "downloaded from http://www.wirelessnetworksonline.com/article.mvc/Allen-Telecoms-radio-over-fiber-technology-po-0001 on May 6, 2011", Sep. 29, 2000, p. 1, Publisher: VertMarkets Inc.

(Continued)

*Primary Examiner* — Myron Wyche
(74) *Attorney, Agent, or Firm* — Fogg & Powers LLC

(57) ABSTRACT

Certain aspects are directed to a capacity optimization sub-system for a distributed antenna system. The capacity optimization sub-system includes a switch matrix and a controller. The switch matrix includes variable attenuators and switches. The switch matrix can receive sectors from base stations. The switch matrix can provide the sectors to coverage zones. The controller can communicate with the switch matrix. The controller can determine that a number of wireless devices in one or more of the coverage zones is outside a specified range of threshold traffic levels. In response to determining that the number of wireless devices is outside the specified range of threshold traffic levels, the controller can configure one or more of the variable attenuators and corresponding switches to redistribute capacity among the coverage zones by, for example, increasing and/or decreasing capacity in one or more of the coverage zones.

20 Claims, 6 Drawing Sheets

(51) Int. Cl.
*H04W 28/08* (2009.01)
*H04W 28/02* (2009.01)
*H04W 88/08* (2009.01)

(56) References Cited

U.S. PATENT DOCUMENTS

| | | | |
|---|---|---|---|
| 5,506,848 A * | 4/1996 | Drakopoulos | H04W 72/0446 370/336 |
| 5,507,007 A | 4/1996 | Gunmar et al. | |
| 5,574,466 A | 11/1996 | Reed et al. | |
| 5,584,049 A | 12/1996 | Weaver, Jr. et al. | |
| 5,594,350 A | 1/1997 | Koizumi et al. | |
| 5,621,786 A | 4/1997 | Fischer et al. | |
| 5,627,879 A | 5/1997 | Russell et al. | |
| 5,642,405 A | 6/1997 | Fischer et al. | |
| 5,644,622 A | 7/1997 | Russell et al. | |
| 5,657,374 A | 8/1997 | Russell et al. | |
| 5,682,256 A | 10/1997 | Motley et al. | |
| 5,682,383 A * | 10/1997 | Dahod | H04L 12/44 370/364 |
| 5,694,082 A | 12/1997 | Schmidt | |
| 5,737,703 A | 4/1998 | Byrne | |
| 5,748,001 A | 5/1998 | Cabot | |
| 5,809,422 A | 9/1998 | Raleigh et al. | |
| 5,852,651 A | 12/1998 | Fischer et al. | |
| 5,854,986 A | 12/1998 | Dorren et al. | |
| 5,889,494 A | 3/1999 | Reudink et al. | |
| 5,909,642 A | 6/1999 | Suzuki | |
| 6,009,129 A | 12/1999 | Kenney et al. | |
| 6,047,199 A | 4/2000 | DeMarco | |
| 6,070,090 A | 5/2000 | Feuerstein | |
| 6,128,500 A | 10/2000 | Raghavan et al. | |
| 6,144,692 A | 11/2000 | Beck | |
| 6,154,655 A | 11/2000 | Borst et al. | |
| 6,198,435 B1 | 3/2001 | Reudink et al. | |
| 6,272,337 B1 | 8/2001 | Mount et al. | |
| 6,366,776 B1 | 4/2002 | Wright et al. | |
| 6,374,124 B1 | 4/2002 | Slabinski | |
| 6,415,132 B1 | 7/2002 | Sabat | |
| 6,418,327 B1 | 7/2002 | Carey et al. | |
| 6,504,831 B1 | 1/2003 | Greenwood et al. | |
| 6,594,496 B2 | 7/2003 | Schwartz | |
| 6,615,036 B1 * | 9/2003 | Haas | H04M 3/533 455/413 |
| 6,646,449 B2 | 11/2003 | Seppinen et al. | |
| 6,704,545 B1 | 3/2004 | Wala | |
| 6,708,036 B2 | 3/2004 | Proctor et al. | |
| 6,731,237 B2 | 5/2004 | Gustafson et al. | |
| 6,785,558 B1 | 8/2004 | Stratford et al. | |
| 6,801,767 B1 | 10/2004 | Schwartz et al. | |
| 6,826,163 B2 | 11/2004 | Mani et al. | |
| 6,826,164 B2 | 11/2004 | Mani et al. | |
| 6,831,901 B2 | 12/2004 | Millar | |
| 6,842,431 B2 | 1/2005 | Clarkson et al. | |
| 6,873,827 B1 | 3/2005 | Wright | |
| 6,895,247 B2 | 5/2005 | Mostafa | |
| 6,937,863 B1 | 8/2005 | Gordon et al. | |
| 6,963,552 B2 | 11/2005 | Sabat et al. | |
| 6,975,606 B2 | 12/2005 | Korinek et al. | |
| 6,996,374 B1 | 2/2006 | Bao et al. | |
| 7,013,136 B2 | 3/2006 | Frangione et al. | |
| 7,025,262 B2 | 4/2006 | Byskov et al. | |
| 7,082,320 B2 | 7/2006 | Kattukaran et al. | |
| 7,120,546 B2 | 10/2006 | Zyss et al. | |
| 7,123,023 B2 | 10/2006 | Minihold et al. | |
| 7,127,175 B2 | 10/2006 | Mani et al. | |
| 7,127,211 B2 | 10/2006 | Hildebrand et al. | |
| 7,162,203 B1 * | 1/2007 | Brunner | H04W 16/06 455/522 |
| 7,205,864 B2 | 4/2007 | Schultz et al. | |
| 7,215,651 B2 | 5/2007 | Millar | |
| 7,224,170 B2 | 5/2007 | Graham et al. | |
| 7,286,507 B1 | 10/2007 | Oh et al. | |
| 7,313,415 B2 | 12/2007 | Wake et al. | |
| 7,398,106 B2 | 7/2008 | Conyers et al. | |
| 7,403,503 B2 | 7/2008 | Cuffaro et al. | |
| 7,423,988 B2 | 9/2008 | Hedin et al. | |
| RE40,564 E | 11/2008 | Fischer et al. | |
| 7,469,105 B2 | 12/2008 | Wake et al. | |
| 7,474,635 B2 | 1/2009 | Linsky et al. | |
| 7,548,695 B2 | 6/2009 | Wake | |
| 7,574,234 B2 | 8/2009 | Conyers et al. | |
| 7,639,982 B2 | 12/2009 | Wala | |
| 7,640,019 B2 | 12/2009 | Conyers et al. | |
| 7,653,149 B2 | 1/2010 | Strich et al. | |
| 7,702,985 B2 | 4/2010 | Millar | |
| 7,761,093 B2 | 7/2010 | Sabat et al. | |
| 7,787,854 B2 | 8/2010 | Conyers et al. | |
| 7,796,554 B2 | 9/2010 | Liu et al. | |
| 7,873,318 B2 | 1/2011 | Nagai et al. | |
| 7,876,867 B2 | 1/2011 | Filipovic et al. | |
| 7,920,858 B2 | 4/2011 | Sabat et al. | |
| 8,000,649 B2 | 8/2011 | Shiff et al. | |
| 8,036,156 B2 | 10/2011 | Hedin et al. | |
| 8,160,570 B2 | 4/2012 | Sabat et al. | |
| 8,175,540 B2 | 5/2012 | Jones | |
| 8,194,597 B2 | 6/2012 | Feder et al. | |
| 8,290,483 B2 | 10/2012 | Sabat, Jr. et al. | |
| 8,326,218 B2 | 12/2012 | Wala | |
| RE43,964 E | 2/2013 | Fischer et al. | |
| RE44,398 E | 7/2013 | Conyers et al. | |
| 8,515,339 B2 | 8/2013 | Yona et al. | |
| 8,542,768 B2 | 9/2013 | Kim et al. | |
| 8,559,939 B2 | 10/2013 | Sabat et al. | |
| 8,577,286 B2 | 11/2013 | Wala | |
| 8,583,100 B2 | 11/2013 | Koziy et al. | |
| 8,682,338 B2 | 3/2014 | Lemson et al. | |
| 8,724,664 B2 | 5/2014 | Stapleton et al. | |
| 8,737,300 B2 | 5/2014 | Stapleton et al. | |
| 8,737,454 B2 | 5/2014 | Wala et al. | |
| 8,817,848 B2 | 8/2014 | Lemson et al. | |
| 8,824,595 B2 | 9/2014 | Kim et al. | |
| 8,831,593 B2 | 9/2014 | Melester et al. | |
| 8,848,766 B2 | 9/2014 | Lemson et al. | |
| RE45,321 E | 1/2015 | Fischer et al. | |
| 9,025,956 B2 | 5/2015 | Stapleton et al. | |
| 9,048,797 B2 | 6/2015 | Kim et al. | |
| 9,137,078 B2 | 9/2015 | Stapleton et al. | |
| 9,148,203 B2 | 9/2015 | Lemson et al. | |
| 9,148,324 B2 | 9/2015 | Stapleton et al. | |
| 9,197,358 B2 | 11/2015 | Hejazi et al. | |
| 9,236,897 B2 | 1/2016 | Stapleton et al. | |
| 9,913,147 B2 | 3/2018 | Brighenti et al. | |
| 2002/0094785 A1 | 7/2002 | Deats | |
| 2002/0186674 A1 | 12/2002 | Mani et al. | |
| 2003/0039319 A1 | 2/2003 | Engelse et al. | |
| 2003/0040329 A1 | 2/2003 | Yona et al. | |
| 2003/0073463 A1 | 4/2003 | Shapira | |
| 2003/0153273 A1 | 8/2003 | Ebert et al. | |
| 2005/0102449 A1 | 5/2005 | Durston | |
| 2005/0147067 A1 | 7/2005 | Mani et al. | |
| 2005/0157675 A1 | 7/2005 | Feder et al. | |
| 2005/0259684 A1 | 11/2005 | Csapo | |
| 2006/0002326 A1 | 1/2006 | Vesuna | |
| 2006/0019679 A1 | 1/2006 | Rappaport et al. | |
| 2006/0094470 A1 | 5/2006 | Wake et al. | |
| 2006/0166676 A1 | 7/2006 | Rajkotia et al. | |
| 2007/0010224 A1 | 1/2007 | Shi | |
| 2007/0147294 A1 | 6/2007 | Bose et al. | |
| 2007/0213006 A1 | 9/2007 | Wong et al. | |
| 2007/0259625 A1 | 11/2007 | Tolaio et al. | |
| 2008/0039089 A1 | 2/2008 | Berkman et al. | |
| 2008/0076406 A1 | 3/2008 | Chen et al. | |
| 2008/0076435 A1 | 3/2008 | Chen et al. | |
| 2008/0287083 A1 | 11/2008 | Payne | |
| 2008/0298445 A1 | 12/2008 | Richardson et al. | |
| 2009/0017835 A1 | 1/2009 | Song et al. | |
| 2009/0061940 A1 | 3/2009 | Scheinert et al. | |
| 2009/0086028 A1 | 4/2009 | Miller et al. | |
| 2009/0239475 A1 | 9/2009 | Lehman | |
| 2010/0029237 A1 | 2/2010 | Yamamoto et al. | |
| 2010/0085061 A1 | 4/2010 | Bradley et al. | |
| 2010/0113006 A1 | 5/2010 | Pajjuri et al. | |
| 2010/0128676 A1 | 5/2010 | Wu et al. | |

(56) References Cited

U.S. PATENT DOCUMENTS

| | | |
|---|---|---|
| 2010/0164504 A1 | 7/2010 | Bradley |
| 2010/0178929 A1 | 7/2010 | Kennedy, Jr. et al. |
| 2010/0178936 A1 | 7/2010 | Wala et al. |
| 2010/0197238 A1 | 8/2010 | Pathuri et al. |
| 2010/0202356 A1 | 8/2010 | Fischer et al. |
| 2010/0260103 A1 | 10/2010 | Guey et al. |
| 2010/0278530 A1 | 11/2010 | Kummetz et al. |
| 2010/0295533 A1 | 11/2010 | Kuga et al. |
| 2011/0059709 A1 | 3/2011 | Collins |
| 2011/0105184 A1 | 5/2011 | Piirainen et al. |
| 2011/0135308 A1 | 6/2011 | Tarlazzi et al. |
| 2011/0143812 A1 | 6/2011 | Ogawa |
| 2011/0151839 A1 | 6/2011 | Bolon et al. |
| 2011/0158081 A1 | 6/2011 | Wang et al. |
| 2011/0164878 A1 | 7/2011 | Ma et al. |
| 2011/0194548 A1 | 8/2011 | Feder et al. |
| 2011/0201269 A1 | 8/2011 | Hobbs et al. |
| 2012/0039254 A1 | 2/2012 | Stapleton et al. |
| 2012/0093269 A1 | 4/2012 | Yu et al. |
| 2012/0155572 A1 | 6/2012 | Kim et al. |
| 2012/0329523 A1 | 12/2012 | Stewart et al. |
| 2013/0017863 A1 | 1/2013 | Kummetz et al. |
| 2013/0071112 A1 | 3/2013 | Melester et al. |
| 2013/0114486 A1 | 5/2013 | Spedaliere et al. |
| 2013/0114963 A1 | 5/2013 | Stapleton et al. |
| 2013/0128810 A1 | 5/2013 | Lee et al. |
| 2013/0182753 A1 | 7/2013 | Delforce et al. |
| 2014/0010168 A1 | 1/2014 | Stapleton et al. |
| 2014/0010548 A1 | 1/2014 | Berlin et al. |
| 2014/0036770 A1 | 2/2014 | Stapleton et al. |
| 2014/0057627 A1 | 2/2014 | Hejazi et al. |
| 2014/0079153 A1 | 3/2014 | Kim et al. |
| 2014/0119197 A1 | 5/2014 | Maca et al. |
| 2014/0206282 A1 | 7/2014 | Stapleton et al. |
| 2014/0233468 A1 | 8/2014 | Hejazi et al. |
| 2014/0269318 A1 | 9/2014 | Hasarchi et al. |
| 2014/0286247 A1 | 9/2014 | Lemson et al. |
| 2014/0313884 A1 | 10/2014 | Stapleton et al. |
| 2015/0080054 A1 | 3/2015 | Kim et al. |
| 2015/0264582 A1 | 9/2015 | Brighenti et al. |

FOREIGN PATENT DOCUMENTS

| | | |
|---|---|---|
| CN | 101635590 A | 1/2010 |
| CN | 102077683 A | 5/2011 |
| CN | 103733664 A | 4/2014 |
| CN | 103875270 A | 6/2014 |
| CN | 103891179 A | 6/2014 |
| EP | 0562743 A1 | 9/1993 |
| EP | 1081883 A2 | 3/2001 |
| EP | 1096817 A1 | 5/2001 |
| EP | 2169994 A2 | 3/2010 |
| EP | 2661828 A1 | 11/2013 |
| EP | 2732653 A1 | 5/2014 |
| EP | 2756619 B1 | 3/2017 |
| EP | 2904831 B1 | 10/2017 |
| JP | 2002190780 A | 7/2002 |
| JP | 2005151189 A | 6/2005 |
| KR | 19980067669 A | 10/1998 |
| KR | 20020041516 A | 6/2002 |
| KR | 20050049070 A | 5/2005 |
| KR | 20060120361 A | 11/2006 |
| KR | 20070118460 A | 12/2007 |
| KR | 20080086604 A | 9/2008 |
| KR | 20090080762 A | 7/2009 |
| KR | 20140004548 A | 1/2014 |
| WO | 9212601 A1 | 7/1992 |
| WO | 9739597 A1 | 10/1997 |
| WO | 2005109700 A1 | 11/2005 |
| WO | 2007044653 A1 | 4/2007 |
| WO | 2008027213 A2 | 3/2008 |
| WO | 2008088862 A1 | 7/2008 |
| WO | 2009021359 A1 | 2/2009 |
| WO | 2009039396 A2 | 3/2009 |
| WO | 2009082084 A1 | 7/2009 |
| WO | 2013009835 A1 | 1/2013 |
| WO | 2013033199 A1 | 3/2013 |
| WO | 2013040579 A1 | 3/2013 |
| WO | 2013040589 A1 | 3/2013 |
| WO | 2014053149 A1 | 4/2014 |

OTHER PUBLICATIONS

"An Introduction to Neutral Host Distributed Antenna Systems", Nov. 7, 2004, pp. 1-14, Publisher: Infinigy Networks.

"Distributed Antenna Systems and MIMO Technology", Apr. 2011, pp. 1-8, Publisher: TE Connectivity Wireless and Services.

"Mikom U.S. Announces Immediate Availability of Multiple Solutions for the Most Flexible Wireless Signal Distribution System: The Base Station Hotel", "PRNewswire; Downloaded from http://www.prnewswire.com/news-releases/mikom-us-announces-immediate-availablity-of-multiple-solutions-for-the-most-flex", Jan. 13, 2003, pp. 1-2, Publisher: United Business Media.

"Tekmar Eases mobile Traffic Congestion at Olympic Games", "Downloaded from http://www.telecompaper.com/news/tekmar-eases-mobile-traffic-congestion-at-olympic-games, on May 6, 2011", Sep. 8, 2000, p. 1, Publisher: Telecompaper.

"The Vanu Anywave Base Station Subsystem", "http://www.vanu.com/documents/technology/vanu-anywave-2006-05.pdf, downloaded on May 6, 2011", Apr. 2006, pp. 1-10, Publisher: Vanu, Inc.

Bell et al., "Range to Fault Technology", "http://www.livingston.co.uk/files/bestanden/rtfwhitepaper.pdf", Jan. 1, 2011, pp. 1-10, Publisher: Kaelus, Inc.

Brahmanapally et al., "Analysis and Determination of intermodulation hits in Mobile Communication", "Proceedings of the 8th WSEAS International Conference on Data Networks, Communications, Computers, DNCOCO'09", Nov. 7, 2009, pp. 130-134, (Provided one page abstract only).

Chalmers, "Detecting and Correcting Intermodulation", "Global Communications", Jan. 1985, pp. 22-25, vol. 7, No. 1, (Provided one page abstract only).

China Patent Office, "Office Action for CN Application No. CN 201280050939.8", "from Foreign Counterpart to U.S. Appl. No. 13/621,504", dated Dec. 3, 2014, pp. 1-11, Published in: CN.

Choi et al., "Downlink Performance and Capacity of Distributed Antenna Systems in a Multicell Environment", IEEE Transactions on Wireless Communications retrieved from the internet at http://web.archive.org/web/20150402192857/http://users.ece.utexas.edu/jandrews/publications/ChoAnd-DAS-Twireless.pdf (2007).

European Patent Office, "International Search Report from PCT Application No. PCT/EP2012/004179 dated Aug. 6, 2013", from Foreign Counterpart U.S. Appl. No. 14/433,341, filed Aug. 6, 2013, pp. 1-4, Published: EP.

European Patent Office, "Communication pursuant to Article 94(3) for EP Application No. 12778954.3", "Foreign Counterpart to U.S. Appl. No. 14/433,341", dated Jun. 10, 2016, pp. 1-4, Published in: EP.

European Patent Office, "Communication under Rule 71(3) for EP Application No. 12778954.3", "Foreign Counterpart to U.S. Appl. No. 14/433,341", dated May 8, 2017, pp. 1-44, Published in: EP.

European Patent Office, "Extended European Search Report for EP 12832171.8", dated Apr. 24, 2014, pp. 1-9, Published in: EP.

European Patent Office, "Extended European Search Report for EP Application No. 12826731.7", "from Foreign Counterpart to U.S. Appl. No. 13/597,900", dated Mar. 12, 2015, pp. 1-10, Published in: EP.

European Patent Office, "International Search Report and Written Opinion from PCT Application No. PCT/US2012/046207", from Foreign Counterpart to U.S. Appl. No. 13/546,425 dated Nov. 15, 2012, pp. 1-9, Published in: WO.

Feng et al., "Downlink Capacity of Distributed Antenna Systems in a Multi-Cell Environment", "Communications and Networking", Sep. 2010, pp. 173-186.

Garcia et al., "Impact of Base Station Cooperation on Cell Planning", EURASIP Journal on Wireless Communications and Networking, 2010, Article ID 406749.

(56) References Cited

OTHER PUBLICATIONS

Heath, Jr. et al., "Multiuser MIMO in Distributed Antenna Systems", "Signals, Systems and Computers (Asilomar), 2010 Conference Record of the Forty Fourth Asilomar Conference", Nov. 2010, pp. 1-5.
International Preliminary Examining Authority, "International Preliminary Report on Patentability for International Application No. PCT/EP2012/004179 dated Dec. 19, 2014", "from Foreign Counterpart to U.S. Appl. No. 14/433,341" filed Dec. 19, 2014, pp. 1-9, Published: EP.
International Searching Authority, "Notification of Transmittal of the International Search Report and the Written Opinion of the International Searching Authority from PCT Application No. PCT/US2015/059427", "from Foreign Counterpart to U.S. Appl. No. 14/534,810", dated Feb. 24, 2016, pp. 1-11, Published in: WO.
Kalfas et al., "An Agile and Medium-Transparent MAC Protocol for 60 GHz Radio-Over-Fiber Local Access Networks", "Journal of Lightwave Technology", Aug. 15, 2010, pp. 2315-2326, vol. 28, No. 16, Publisher: IEEE.
Korean Intellectual Property Office, "International Search Report for PCT Application No. PCT/US2012/052845", "from Foreign Counterpart to U.S. Appl. No. 13/597,900", dated Jan. 30, 2013, pp. 1-3, Published in: WO.
Korean Intellectual Property Office, "International Search Report and Written Opinion for PCT/US2012/055793", "from Foreign Counterpart to U.S. Appl. No. 13/978,966", dated Dec. 28, 2012, pp. 1-7, Published in: WO.
Korean Intellectual Property Office, "International Search Report from PCT/US2012/055807", from Foreign Counterpart to U.S. Appl. No. 13/621,504 dated Dec. 26, 2012, pp. 1-7, Published in: WO.
Nash, "Intermodulation Distortion Problems at UMTS Cell Sites", "http://www.aeroflex.com/ats/products/prodfiles/articles/8814/Intermod.pdf", Jan. 3, 2010, pp. 1-10, Publisher: Aeroflex Wireless Test Solutions, Published in: Burnham, UK.
Nguyen et al., "Use of Adaptive Sectorisation for Capacity Enhancement in CDMA Cellular Systems with Non-Uniform Traffic", Wireless Personal Communications 28: 107-120, 2004.
Ni et al., "Distributed Antenna Systems and their applications in 4G Wireless Systems", 2011 IEEE.
Qiang et al., "Study on Computer-Based Integrated Passive Inter-Modualtion Measurement System", "Chinese Journal of Scientific Instrument", Jul. 2009, pp. 1540-1545, (Provided two page abstract only).
Seeds, "Broadband Access Using Wireless Over Fibre Systems", "http://www.ee.ucl.ac.uk/isis/notes/ISIS1.pdf, downloaded May 6, 2011", at least as early as Dec. 2006, pp. 1-43, Publisher: Department of Electronic & Electrical Engineering, University College London.
Seeds, "Wireless Access Using Microwave Photonics", "http://cfp.mit.edu/publications/CFP-Presentations/Jun04/Seeds-6-04.pdf, downloaded on May 6, 2011,", Jun. 2004, pp. 1-27, Publisher: Department of Electronic & Electrical Engineering, Universite College London.
Singh et al., "Systems Methodology for PIM Mitigation of Communications Satellites", "4th International Workshop on Multipactor, Corona and Passive Intermodulation in Space RF Hardware", Sep. 8, 2003, pp. 1-9.
The International Bureau of WIPO, "International Preliminary Report on Patentability from PCT Application No. PCT/US2012/046207 dated Jan. 14, 2014" pp. 1-7, Published: Switzerland.
The International Bureau of WIPO, "International Preliminary Report on Patentability for PCT/US2012/055793", "from Foreign Counterpart to U.S. Appl. No. 13/978,966", dated Mar. 18, 2014, pp. 1-5, Published in: WO.
The International Bureau of WIPO, "International Preliminary Report on Patentability from PCT/US2012/055807", from Foreign Counterpart to U.S. Appl. No. 13/621,504 dated Mar. 18, 2014, pp. 1-5, Published in: WO.
Tolstrup, "Noise", Indoor Radio Planning, A Practical Guide for GSM, DCS, UMTS, HSPA and LTE, Second Edition, Jul. 14, 2011, pp. 295-328.
U.S. Notice of Allowance, "from U.S. Appl. No. 13/621,504", dated Jun. 18, 2014, pp. 1-7, Published in: US.
U.S. Notice of Allowance; "from U.S. Appl. No. 13/978,966", dated Jan. 21, 2015, pp. 1-11, Published in: US.
U.S. Office Action, "from U.S. Appl. No. 13/621,504", dated Feb. 13, 2014, pp. 1-28, Published in: US.
U.S. Office Action, "from U.S. Appl. No. 13/978,966", dated Apr. 15, 2014, pp. 1-34, Published in: US.
U.S. Office Action, "from U.S. Appl. No. 13/978,966", dated Sep. 5, 2014, pp. 1-32, Published in: US.
U.S. Patent and Trademark Office, "Notice of Allowance", U.S. Appl. No. 14/433,341, dated Jun. 21, 2017, pp. 1-9, Published: US.
U.S. Patent and Trademark Office, "Notice of Allowance", U.S. Appl. No. 14/433,341, dated Oct. 16, 2017, pp. 1-11, Published: US.
U.S. Patent and Trademark Office, "Office Action", U.S. Appl. No. 14/433,341, dated Apr. 7, 2016, pp. 1-19, Publication: US.
U.S. Patent and Trademark Office, "Office Action", U.S. Appl. No. 14/433,341, dated Nov. 18, 2016, pp. 1-44, Published: US.
Wake, "Trends and Prospects for Radio Over Fibre Picocells", "2002 International Topical Meeting on Microwave Photonics", Nov. 5-8, 2002, pp. 21-24, Publisher: Department of Electronic & Electrical Engineering, University College London.

\* cited by examiner

: 
CAPACITY OPTIMIZATION SUB-SYSTEM FOR DISTRIBUTED ANTENNA SYSTEM

CROSS-REFERENCE TO RELATED APPLICATIONS

This is a continuation of U.S. patent application Ser. No. 14/433,341, filed Apr. 2, 2015, and titled "Capacity Optimization Sub-System for Distributed Antenna System," which is a U.S. national phase under 35 U.S.C. 371 of International Patent Application No. PCT/EP2012/004179, titled "Capacity Optimization Sub-System for Distributed Antenna System" and filed Oct. 5, 2012, the contents of each of which are incorporated herein by reference.

TECHNICAL FIELD

This disclosure relates generally to telecommunications systems and more particularly relates to optimizing capacity distribution in distributed antenna systems.

BACKGROUND

A telecommunications system, such as a distributed antenna system, can provide signal coverage to several different coverage zones in which wireless devices are located. Distributed antenna systems may be configured to provide a level of capacity in each of the coverage zones that is sufficient to provide coverage to a maximum number of wireless devices. Configuring a distributed antenna system to provide a level of capacity sufficient to constantly provide coverage to a maximum number of wireless devices fails to account for periods of time in which a reduced level of capacity is sufficient for a reduced number of wireless devices in a coverage zone. For example, a distributed antenna system deployed in a stadium may provide capacity sufficient for a much larger number of wireless devices than is necessary during periods when relatively few wireless devices are present, such as time periods where no event is being hosted in the stadium.

Accordingly, it is desirable to optimize the distribution of capacity in a distributed antenna system having coverage zones with varying numbers of wireless devices serviced by the distributed antenna system.

SUMMARY

In one aspect, a capacity optimization sub-system for distributing capacity in a distributed antenna system is provided. The capacity optimization sub-system includes a switch matrix and a controller. The switch matrix includes variable attenuators and switches. The switch matrix can receive sectors from base stations. The switch matrix can to provide the sectors to coverage zones. The controller can communicate with the switch matrix. The controller can determine that a number of wireless devices in one or more of the coverage zones is outside a specified range of threshold traffic levels. In response to determining that the number of wireless devices is outside the specified range of threshold traffic levels, the controller can configure one or more of the variable attenuators and corresponding switches to redistribute capacity among the coverage zones.

In another aspect, a distributed antenna system is provided. The distributed antenna system includes remote antenna units and a capacity optimization sub-system. The remote antenna units can provide service to coverage zones. At least one remote antenna unit in each coverage zone includes a signal detection device. The capacity optimization includes a switch matrix and a controller. The switch matrix includes variable attenuators and switches. The switch matrix can receive sectors from base stations and provide the sectors to the coverage zones. The controller can communicate with the switch matrix and the remote antenna units. The controller can determine cumulative traffic levels in the coverage zones based on data received from each signal detection device describing a traffic level in a respective coverage zone. In response to determining that the cumulative traffic levels in a first set of coverage zones is below a low threshold traffic level, the controller can configure one or more of the variable attenuators and corresponding switches to decrease capacity in the first set of coverage zones. In response to determining that the cumulative traffic levels in a second set of coverage zones is below a high threshold traffic level, the controller can configure one or more of the variable attenuators to increase capacity in the second set of coverage zones.

In another aspect, a method for optimizing capacity in a distributed antenna system is provided. The method involves a processor determining that a number of wireless devices in one or more coverage zones receiving sectors from base stations is below a threshold corresponding to a low traffic level. In response to determining that the number of wireless devices is below the threshold corresponding to the low traffic level, the processor configures one or more variable attenuators and one or more corresponding switches of a switch matrix of the distributed antenna system to redistribute capacity among coverage zones by increasing and or decreasing capacity in the one or more coverage zones. Decreasing capacity can include attenuating signals from a first source of capacity in at least one coverage zone at a rate sufficient to induce one or more wireless devices in the at least one coverage zone to switch from the first source of capacity to a second source of capacity. The method further involves the processor determining that the number of wireless devices in the one or more coverage zones receiving the sectors is above a threshold corresponding to a high traffic level. In response to determining that the number of wireless devices is above the threshold corresponding to the high traffic level, the processor configures one or more variable attenuators and corresponding switches of the switch matrix to increase capacity in the one or more coverage zones.

These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Figure 1:
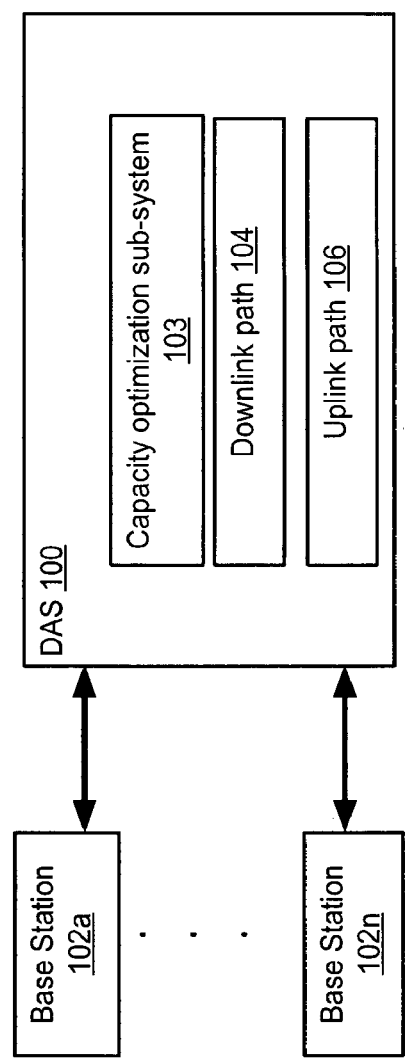
FIG. 1 is a block diagram of a group of base stations coupled to a DAS that has a capacity optimization sub-system according to one aspect.

Certain aspects and features are directed to a capacity optimization sub-system that can be disposed in a telecommunications system, such as a distributed antenna system ("DAS"). The capacity optimization sub-system can redistribute capacity in a DAS such that the power used by the DAS is optimized. For example, the capacity optimization sub-system can determine that a number of wireless devices in one or more coverage zones is outside a specified range of threshold traffic levels. In some aspects, a number of wireless devices can be outside a specified range of threshold traffic levels if the number of wireless devices exceeds a threshold corresponding to a high level of traffic in a coverage zone. In other aspects, a number of wireless devices can be outside a specified range of threshold traffic levels if the number of wireless devices is less than a threshold corresponding to a low level of traffic in a coverage zone. In response to determining that the number of wireless devices is outside the specified range of threshold traffic levels, the capacity optimization sub-system can redistribute capacity among the plurality of coverage zones. The capacity optimization sub-system can also gradually attenuate signals being transmitted to a wireless device. Gradually attenuating the signals being transmitted to a wireless device can cause the wireless device to hand over to or otherwise switch to a different source of capacity for communicating via the DAS. A different source of capacity can include frequency channels associated with a different base station.

Capacity can include a group of frequency channels by which wireless devices located in a coverage zone of a DAS can communicate. A coverage zone of a DAS can include one or more remote antenna units that provide signal coverage to the wireless device in a geographic area. Multiple base stations can provide capacity to the coverage zones of a DAS. Redistributing capacity can include changing the number of wireless devices that can be supported in different coverage zones based on the concentration of wireless devices in each coverage zone. Capacity can be redistributed by reassigning or otherwise reallocating some or all of the frequency channels provided by a base station from a first coverage zone to a second coverage zone.

A DAS can provide capacity to one or more coverage zones. A capacity optimization sub-system of a DAS can optimize the capacity provided to one or more coverage zones. Optimizing the capacity of a DAS can include modifying the capacity allocated among a group of coverage zones based on the traffic in the one or more coverage zones. The traffic in a coverage zone can include the number of wireless devices communicating via the DAS in the coverage zone.

The capacity optimization sub-system can include a controller and a switch matrix that includes variable attenuators and switches. The controller can be communicatively coupled to the switch matrix. The controller can determine that a number of wireless devices in one or more coverage zones serviced by the distributed antenna system is below a threshold traffic level. In some aspects, the controller can determine that the number of wireless devices is below a threshold traffic level by communicating with one or more signal detection devices disposed in remote antenna units servicing the coverage zones.

In other aspects, the controller can determine that the number of wireless devices is below a threshold traffic level based on a scheduling algorithm for determining time periods in which the expected number of wireless devices in a coverage zone will decrease.

The controller can configure one or more of variable attenuators and one or more corresponding switches to redistribute or otherwise increase or decrease capacity in one or more coverage zones in response to determining that the number of wireless devices is below the threshold traffic level. The controller can configure the variable attenuators to attenuate signals being provided from a first source of capacity to one or more wireless devices in the one or more coverage zones. The controller can determine a rate of attenuation based on the traffic level in the coverage zone for which capacity is decreased. A first source of capacity may be one or more sectors from a first base station communicatively coupled to the DAS. The rate of attenuation of the signals by the variable attenuators can be sufficient to induce the one or more wireless devices to switch to a second source of capacity. A second source of capacity may be one or more sectors from a second base station communicatively coupled to the DAS. The controller can configure the switches of the switch matrix to redistribute capacity from the first source of capacity based on the attenuators simulating a level of fading sufficient to induce wireless device to switch to the second source of capacity. For example, the switches can be configured to modify the routing of signals from the first source of capacity different coverage zones based on a sufficient number of wireless devices switching to the second source of capacity.

In some aspects, the controller can execute a scheduling algorithm to optimize capacity. In other aspects, the controller can optimize capacity based on data received from one or more signal detection devices describing signal traffic in the one or more coverage zones. A signal detection device can be any device configured to scan one or more frequencies and detect one or more signals on the one or more frequencies, such as (but not limited to) an uplink signal sniffer or a frequency scanner. A signal detection device can communicate traffic data with the controller via an uplink path between a remote antenna unit and a device in which the controller is disposed. In additional or alternative embodiments, a signal detection device can communicate traffic data with the controller via a control path separate from the downlink path or uplink path. The control path can be any communication medium suitable for wired or wireless communication between signal detection device and controller. Non-limiting examples of a suitable communication medium include copper wire (such as coaxial cable), optical fiber, and microwave or optical link. The traffic data can identify signals on one or more frequencies detected by the signal detection device.

The switch matrix of the capacity optimization sub-system can be configured to redistribute capacity among coverage zones and reduce the overall energy consumption such that the output power of the DAS is optimized. In some aspects, an optimized output power of the DAS can be obtained based on the number of device in each coverage zone being between a threshold number of devices corresponding to a low traffic level and a threshold number of devices corresponding to a high traffic level. For example, the switch matrix can reduce the output power of 3 dB or 6 dB in a coverage zone where there are few wireless devices, such as an office building during an eight-hour period at night or in a stadium not hosting events during a five-day period. Optimizing the output power of a DAS can reduce overall energy consumption and operational expenditures associated with operating the DAS. Optimizing the output power of a DAS can also increase mean time between failures for remote antenna units of a DAS by, for example, increasing the operating lifespan of device components such as capacitors and other semiconductors.

A telecommunications system having a DAS, such as an active DAS, and one or more bases stations can be configured to provide a specified level of capacity in one or more coverage zones during specified intervals of time. For intervals during which a large number of wireless devices are present in a coverage zone, the DAS can be configured to provide the specified level of capacity. For other intervals during which fewer wireless devices are present in the coverage zone, the DAS can be configured to provide a level of capacity below the specified level of capacity.

The capacity optimization sub-system can reduce dropped calls that may otherwise result from redistributing capacity in a DAS. A wireless device in the first coverage zone using a frequency channel from the base station can experience a dropped call if capacity is redistributed too rapidly for the wireless device to hand over to a different frequency channel. For example, abruptly redistributing capacity in a DAS can prevent a wireless device communicating via a first source of capacity, such as a sector from a first base station, from switching to a second source of capacity, such as a sector from a second base station. For a coverage zone in which capacity is reduced, the capacity optimization sub-system can gradually attenuate the signal strength associated with the frequency channels provided from a source of capacity, such as a base station. Gradually attenuating the signal strength can simulate a slow fading of the signal from the base station. Gradually attenuating the signal strength associated with the frequency channels provided from the base station can cause a wireless device using one of the frequency channels to switch to a frequency channel provided by a different base station that is providing capacity to the coverage zone. The capacity can be redistributed based on a sufficient number of wireless devices switching to a second source of capacity. For example, the capacity optimization sub-system can cease providing capacity from the first source of capacity based on detecting that a majority of the wireless devices or all devices in a coverage area have switched to a second source of capacity.

For example, in a stadium hosting an event, a surrounding parking lot may initially receive capacity from two base stations. The DAS can be reconfigured to provide capacity from only one base station to the parking lot when an event begins. Reconfiguring a DAS can include changing the routing of signals via the switch matrix. When the DAS is reconfigured to provide more capacity to the interior of the stadium, the capacity optimization sub-system can gradually reduce the signal strength associated with the frequency channels provided by the first base station. The reduced signal strength of the signals provided by the first base station could cause wireless devices in the parking lot to hand over to frequency channels provided by the second base station.

Detailed descriptions of certain aspects are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention.

FIG. 1 depicts a capacity optimization sub-system 103 disposed in a DAS 100 communicatively coupled to base stations 102*a-n*. The DAS 100 in FIG. 1 also includes a downlink path 104 and an uplink path 106. The capacity optimization sub-system 103 can optimize distribution of capacity from the base stations 102*a-n* throughout the DAS 100.

Figure 2:
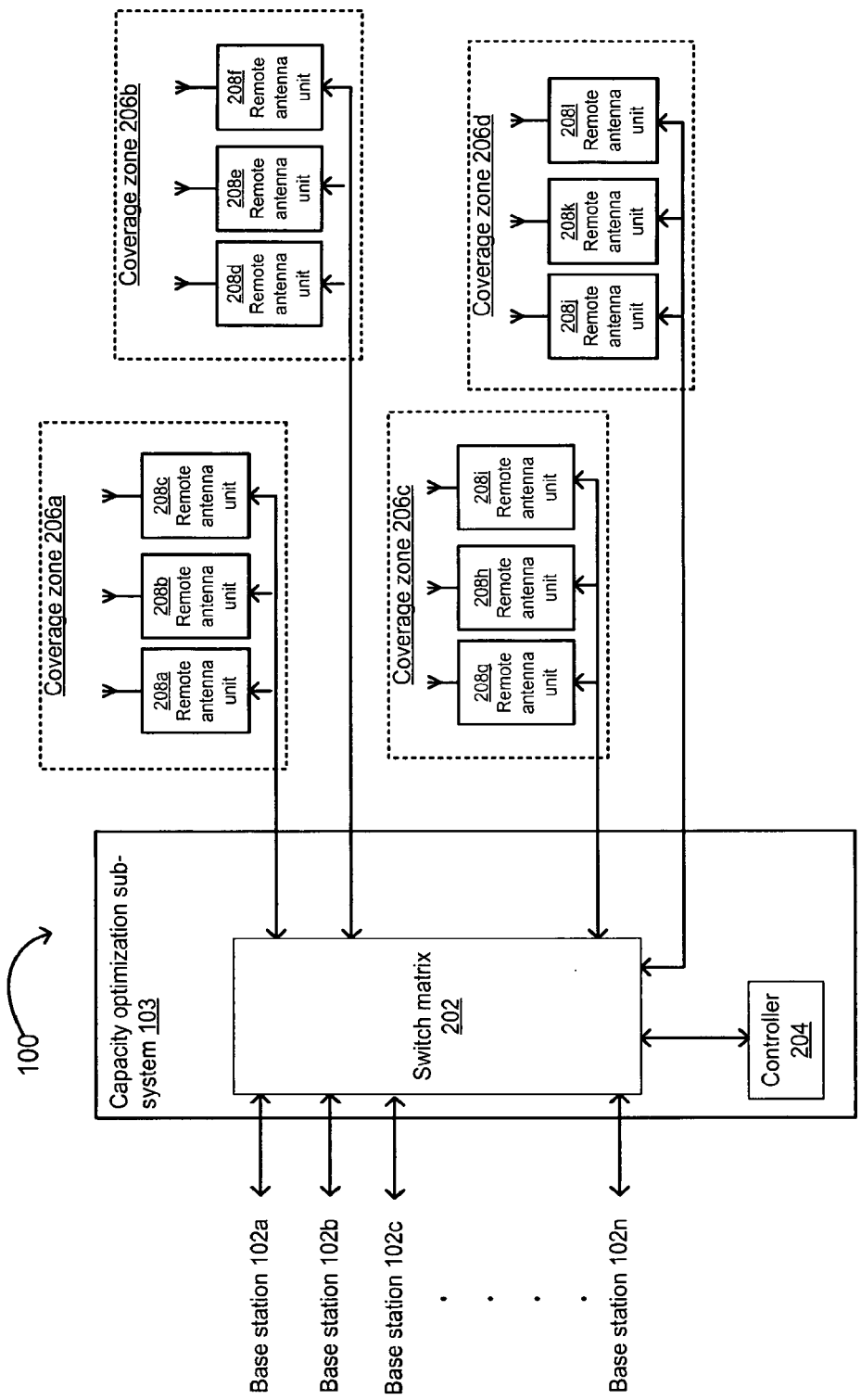
FIG. 2 is a block diagram of a telecommunications system in which a capacity optimization sub-system can be disposed according to one aspect.

FIG. 2 depicts a DAS 100 having a capacity optimization sub-system 103 communicatively coupled to the base stations 102*a-n* and with remote antenna units 208*a-l* servicing the coverage zones 206*a-d*. The DAS 100 can be positioned in an area, such as a stadium or office building, to extend wireless communication coverage of the base stations 102*a-n*. Different base stations 102*a-n* can be associated with different sectors of one telecommunications system operator and/or be associated with different telecommunications system operators. The capacity optimization sub-system 103 can be used with telecommunication technologies such as wideband code division multiple access ("W-CDMA") and ("LTE") using ("MIMO").

The capacity provided by the base stations 102*a-n* can include a cell or cell sectors. For example, an antenna of base station can be sectorized such that the base station provides three sectors. The DAS 100 can provide the sectors of the base stations 102*a-n* to the coverage zones 206*a-d* for use by wireless devices geographically located in the coverage zones 206*a-d*.

In the downlink direction, the DAS 100 can receive signals from the base stations 102*a-n* via a wired or wireless communication medium. Downlink signals can include signals provided from the base stations 102*a-n* and radiated into the coverage zones 206*a-d* by the remote antenna units 208*a-l*. The downlink signals received by the capacity optimization sub-system 103 can be associated with one or more sectors from the base stations 102*a-n*.

The capacity optimization sub-system can include a switch matrix 202 and a controller 204. The switch matrix 202 can route sectors between the base stations 102*a-n* and the coverage zones 206*a-d*. Each of the coverage zones 206*a-d* can correspond to a physical area within the environment of the DAS 100. The DAS 100 can distribute a sector to a single physical area that includes multiple coverage zones. The remote antenna units in the coverage zones of the physical area can radiate the signals of the sector distributed to the physical area.

In some aspects, the capacity optimization sub-system 103 can communicate with both the base stations 102*a-n* and the remote antenna units 208*a-l* using analog RF signals. In other aspects, the capacity optimization sub-system 103 can communicate digital signals with the base stations 102*a-n* and communicate analog RF signals with the remote antenna units 208*a-l*.

Although the capacity optimization sub-system 103 is depicted in FIG. 2 as communicating directly with the base stations 102*a-n*, other configurations are possible. In some aspects, the capacity optimization sub-system 103 can communicate with the base stations 102*a-n* via another component of the DAS 100, such as an intelligent point-of-interface system. In other aspects, the capacity optimization sub-system 103 can be disposed in or integrated with another component of the DAS 100, such as an intelligent point-of-interface system.

The coverage zones 206a-d can include the areas to which the DAS 100 extends signal coverage of the base stations 102a-n. For example, for a DAS 100 that is positioned in a stadium, the coverage zones 206a-d may correspond to different sections of the stadium and the parking lot surrounding the stadium. In another example, for a DAS 100 that is positioned in an office building, each of the coverage zones 206a-d may correspond to a different floor of the building.

Each of the coverage zones 206a-d can include one or more remote antenna units 208a-l. The remote antenna units 208a-l can service a number of different wireless devices, such as cellular phones, operating in the environment of the DAS 100. The remote antenna units of a particular coverage zone can receive the same group of signals from the capacity optimization sub-system 103. The remote antenna units in a coverage zone can radiate the group of signals, such as a sector, received from the capacity optimization sub-system 103 to the coverage zone. The remote antenna units 208a-l can communicate with the capacity optimization sub-system 103 via any communication medium capable of carrying signals between the capacity optimization sub-system 103 and the remote antenna units 208a-l. Examples of a suitable communication medium include copper wire (such as a coaxial cable), optical fiber, and microwave or optical link. The link can transport the signals in analog or in digitized form. As depicted in FIG. 2, different coverage zones can include different numbers of remote antenna units.

In some aspects, the remote antenna units 208a-l can receive analog RF signals from the capacity optimization sub-system 103. In other aspects, the remote antenna units 208a-l can receive digital signals from the capacity optimization sub-system 103 and convert the digital signals to analog RF signals prior to radiating the signals to wireless devices in the coverage zone.

In the uplink direction, the capacity optimization sub-system 103 can receive uplink signals from remote antenna units 208a-l. Uplink signals can include signals received from wireless devices in the coverage zones 206a-d.

Traffic can vary between coverage zones 206a-d as a result of wireless devices moving between coverage zones 206a-d during certain events, such as a stadium having more wireless devices during a sporting event hosted in the stadium, or during certain times of day, such as an office building having more wireless devices during a workday. Capacity can be redistributed among coverage zones 206a-d based on the capacity requirements in each coverage zone over time. For example, a DAS 100 may include a first coverage zone servicing a stadium and a second coverage zone servicing the surrounding parking lot. The DAS can be configured to provide capacity from a group of base stations 102a-n to the coverage zones 206a-d. Prior to the start of an event, more wireless devices may be located in the parking lot than inside the stadium. The capacity optimization sub-system 103 can configure the DAS 100 to provide more capacity to the coverage zones servicing the parking lot. After the event starts, more wireless devices may be located inside the stadium than inside the parking lot. The capacity optimization sub-system can reconfigure the DAS to provide more capacity to the coverage zones servicing interior of the stadium.

In some aspects, each of the remote antenna units of the DAS can include one or more class AB amplifiers. The number of class AB amplifiers included in each remote antenna unit can depend on the number of frequency bands used to communicate signals via the DAS 100. Using a capacity optimization sub-system in a DAS with a coverage zone having remote antenna units with class AB amplifiers can optimize the power consumption in the DAS by, for example, reducing power consumption from 25 watts per band to 19 watts per band. For example, in a DAS having 32 remote antenna units supporting four frequency bands and operating on a twelve-hour cycle, power consumption can be reduced to 1600 watts such that energy savings in a year can reach more than three megawatt-hours.

Figure 3:
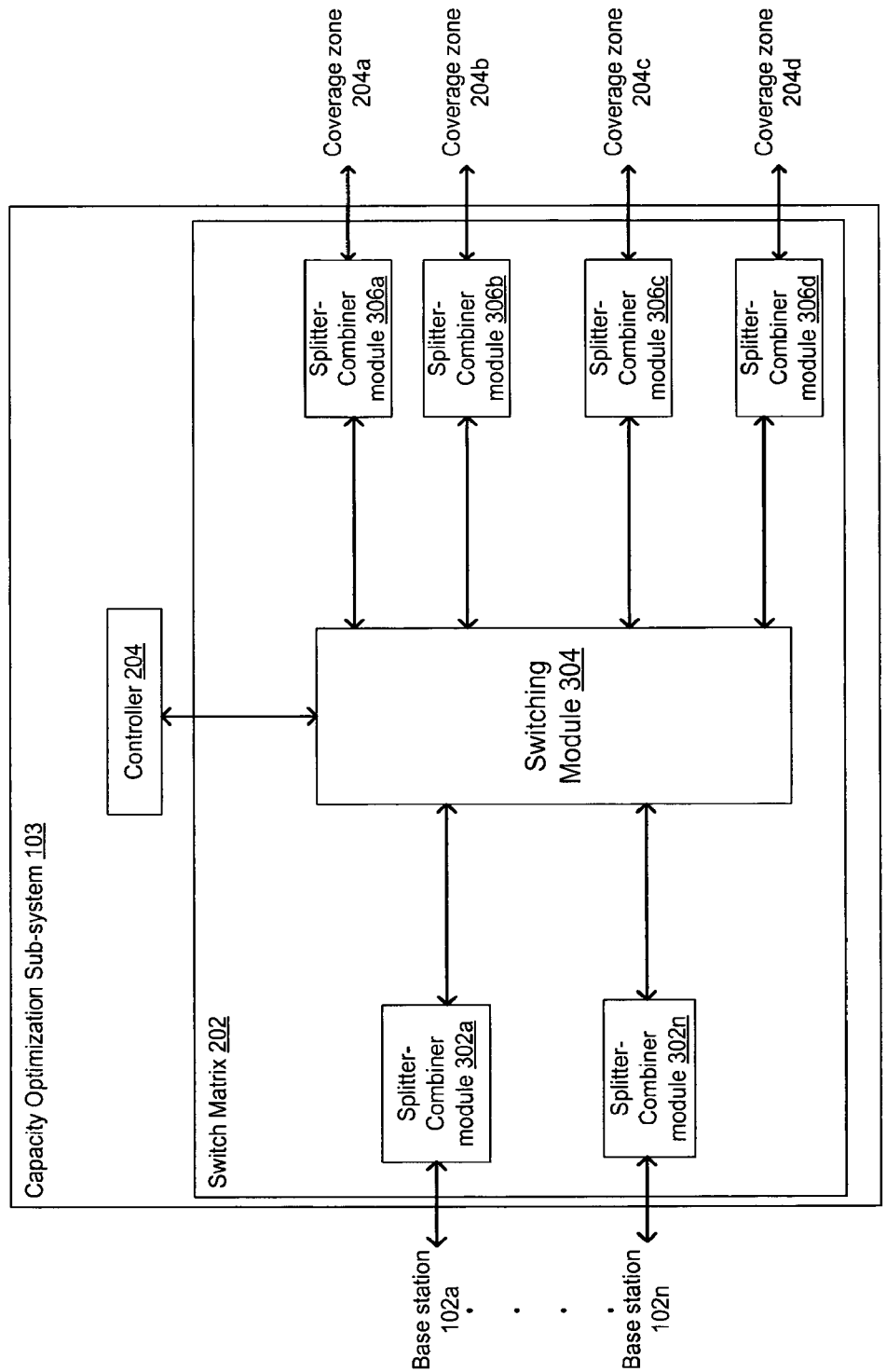
FIG. 3 is a partial block diagram of a capacity optimization sub-system having a switch matrix and a controller according to one aspect.

FIG. 3 is a block diagram of the capacity optimization sub-system 103. The capacity optimization sub-system 103 can include the switch matrix 202 and the controller 204. The switch matrix 202 can include splitter-combiner modules 302a-n, a switching module 304, and splitter-combiner modules 306a-d. The controller can be communicatively coupled to the switching module 304 via any suitable means, such as (but not limited to) a bus or a printed circuit board.

In a downlink direction, downlink signals provided by one or more of the base stations 102a-n can be routed via the splitter-combiner modules 302a-n and the switching module 304 to the splitter-combiner modules 306a-d. The splitter-combiner modules 306a-d can combine signals received via switching module 304. The splitter-combiner modules 306a-d can provide the combined signals to coverage zones 206a-d. In an uplink direction, the splitter-combiner modules 306a-d can receive uplink signals from the coverage zones 206a-d. The splitter-combiner modules 306a-d can route the uplink signals to the splitter-combiner modules 302a-n. The splitter-combiner modules 302a-n can provide the uplink signals to the base stations 102a-n. Each of the splitter-combiner modules can include a splitting component or series of components, such as (but not limited to), power dividers, de-multiplexors, de-serializers, etc. Each of the splitter-combiner modules can include a splitting component or series of components, such as (but not limited to), adders, multiplexors, serializers, etc.

The switching module 304 can selectively route signals from different base stations 102a-n to different splitter-combiner modules 306a-d. For example, the switching module 304 may route signals between all of the base stations 102a-n and the splitter-combiner module 302a, between half of the base stations 102a-n and the splitter-combiner modules 302b, 302c, and between one of the base stations 102a-n to the splitter-combiner module 302a. The switching module 304 can thus allocate capacity from multiple base stations 102a-n for provision to one or more of the coverage zones 206a-d. Although FIG. 3 depicts the switch matrix 202 as having four splitter-combiner modules for providing capacity to four coverage zones, the switch matrix 202 can include any number of splitter-combiner modules (including one).

Figure 4:
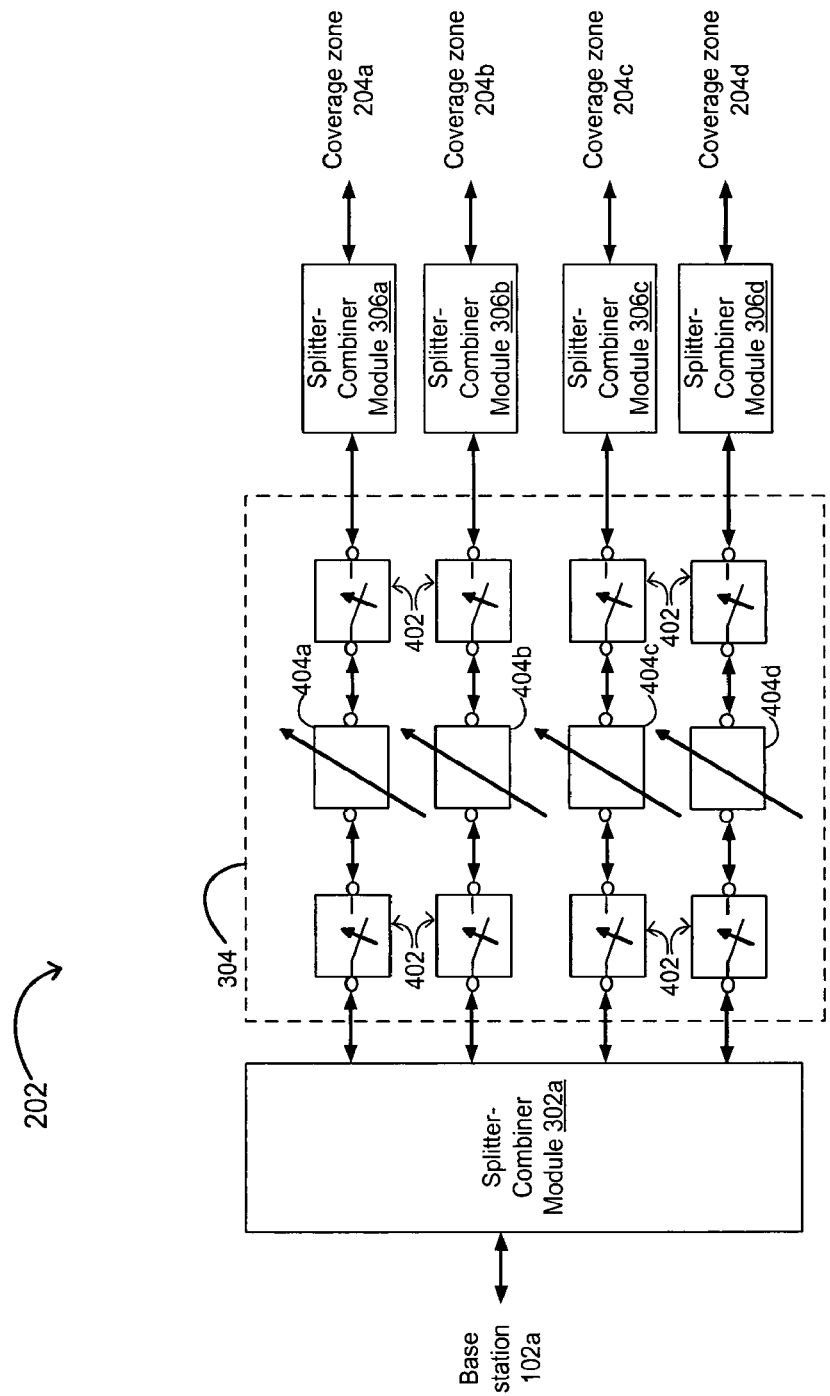
FIG. 4 is a partial schematic diagram of a switching module of a switch matrix for a capacity optimization sub-system according to one aspect.

FIG. 4 is a partial schematic diagram depicting the routing of signals from a base station 102a via the splitter-combiner module 302a and the switching module 304 to the splitter-combiner modules 306a-d. The depiction of the signal paths between just the splitter-combiner module 302a and the splitter-combiner modules 306a-d is an illustrative example for similar configurations of signal paths between one or more of the splitter-combiner modules 302a-n and the splitter-combiner modules 306a-d. The particular depicted shown in FIG. 4 should not be viewed as limiting with respect to the present invention or aspects thereof.

In a downlink direction, the switching module 304 communicates four signals from the splitter-combiner module 302a via four signal paths. Each of the signal paths includes switches 402 and one of the variable attenuators 404a-d. The switches 402 can be used to select which of the splitter-combiner modules 306a-d will receive signals from the base station 102a. The signal strength associated with the coverage from a base station 102*a* in any of the paths can be increased or decreased via the variable attenuator in the path.

An example DAS 100 having the capacity optimization sub-system 103 may be deployed in a stadium. The coverage zones 206*a*, 206*b* can provide coverage inside the stadium. The coverage zones 206*c*, 206*d* can provide coverage to a parking lot outside the stadium. For a five-day period associated with the absence of an event being hosted in the stadium, the attenuators and switches associated with the coverage zones 206*a*, 206*b* can reduce capacity in the coverage zones 206*a*, 206*b*. For example, the attenuators associated with the coverage zones 206*a*, 206*b* can be configured to reduce the output power associated with the downlink path and the output noise level associated with the uplink path of the remote antenna units in coverage zones 206*a*, 206*b* by 3-6 dB, thereby providing a minimum capacity in the coverage zone for wireless devices associated with users such as custodial personnel or training events. Reducing the output power associated with the downlink path in coverage zones 206*a*, 206*b* can optimize or otherwise improve the power consumption of power amplifiers in the downlink path. Reducing the output noise level associated with the uplink path of the remote antenna units in coverage zones 206*a*, 206*b* can optimize or otherwise improve the noise floor of uplink signals communicated to the respective receivers of one or more of base stations 102*a-n*. In some aspects, an optimized noise level of the DAS can be determined based on the number of devices in each coverage zone being between a threshold number of device corresponding to a low traffic level and a threshold number of device corresponding to a high traffic level.

In some aspects, the controller 204 can configure the switch matrix 202 to decrease capacity by attenuating the signal strength of signals associated with a first source of capacity in one of the coverage zones 206*a-d*. The controller 204 can determine a rate of attenuation based on a level of traffic, such as a number of wireless devices, in a coverage zone. The controller 204 can configure the switch matrix 202 such that the rate of attenuation used by a respective attenuator is sufficient to induce wireless devices in a coverage zone to switch from a first source of capacity being redistributed from the coverage zone to a second source of capacity for the coverage zone. A wireless device in a coverage zone in which capacity is reduced can detect that the signal strength associated with the first source of capacity has decreased, thereby causing the wireless device to switch to the second source of capacity. The controller 204 can configure one or more of the switches 402 to redistribute capacity from the first source to one or more different coverage zones based on a sufficient number of wireless devices switching to the second source of capacity.

Figure 5:
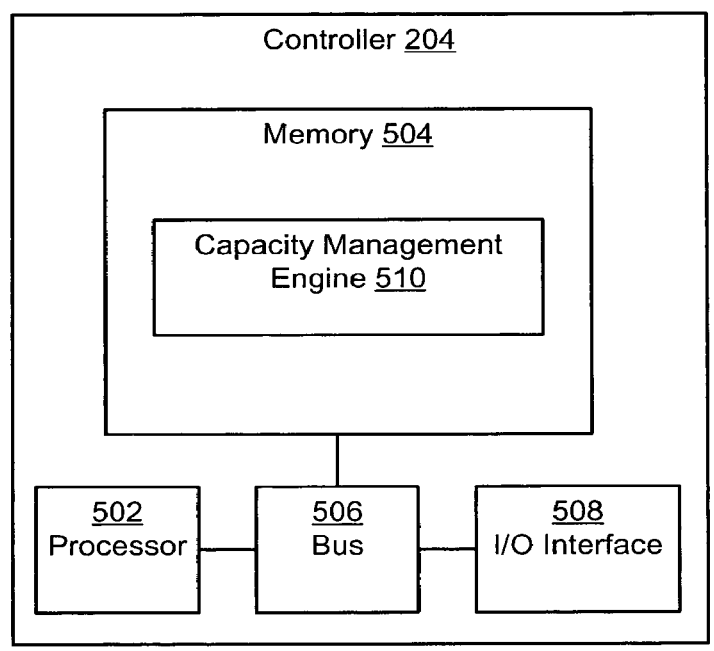
FIG. 5 is a block diagram of a controller for optimizing capacity in a distributed antenna system according to one aspect.

The controller 204 can control the operation of the variable attenuators. FIG. 5 depicts a block diagram of a controller 204 for configuring the switch matrix 202. The controller 204 may be any device that can process data and execute code that is a set of instructions to perform actions.

The controller 204 can include a processor 502 that can execute code stored on a computer-readable medium, such as a memory 504, to cause the controller 204 to manage the capacity provides to the coverage zones 206*a-d*. Examples of processor 502 include a microprocessor, a peripheral interface controller ("PIC"), an application-specific integrated circuit ("ASIC"), a field-programmable gate array ("FPGA"), or other suitable processor. The processor 502 may include one processor or any number of processors.

The processor 502 can access code stored in memory 504 via a bus 506. The memory 504 may be any non-transitory computer-readable medium capable of tangibly embodying code and can include electronic, magnetic, or optical devices. Examples of memory 504 include random access memory (RAM), read-only memory (ROM), magnetic disk, an ASIC, a configured processor, or other storage device. The bus 506 may be any device capable of transferring data between components of the controller 204. The bus 506 can include one device or multiple devices.

Instructions can be stored in memory 504 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

The instructions can include a capacity management engine 510. When executed by the processor 502, the capacity management engine 510 can cause the controller 204 to redistribute capacity in the DAS 100, as explained in more detail below. The controller 204 can receive through input/output (I/O) interface 508 and store in memory 504 inputs such as measurements received from signal detection devices, such as uplink sniffers or frequency scanners, in the remote antenna units 208*a-l*. The capacity management engine 510 can also generate control signals for controller 204 to transmit to the remote antenna units 208*a-l*. The capacity management engine 510 can also execute a scheduling algorithm.

This exemplary system configuration is provided to illustrate configurations of certain aspects. Other configurations may of course be utilized.

Figure 6:
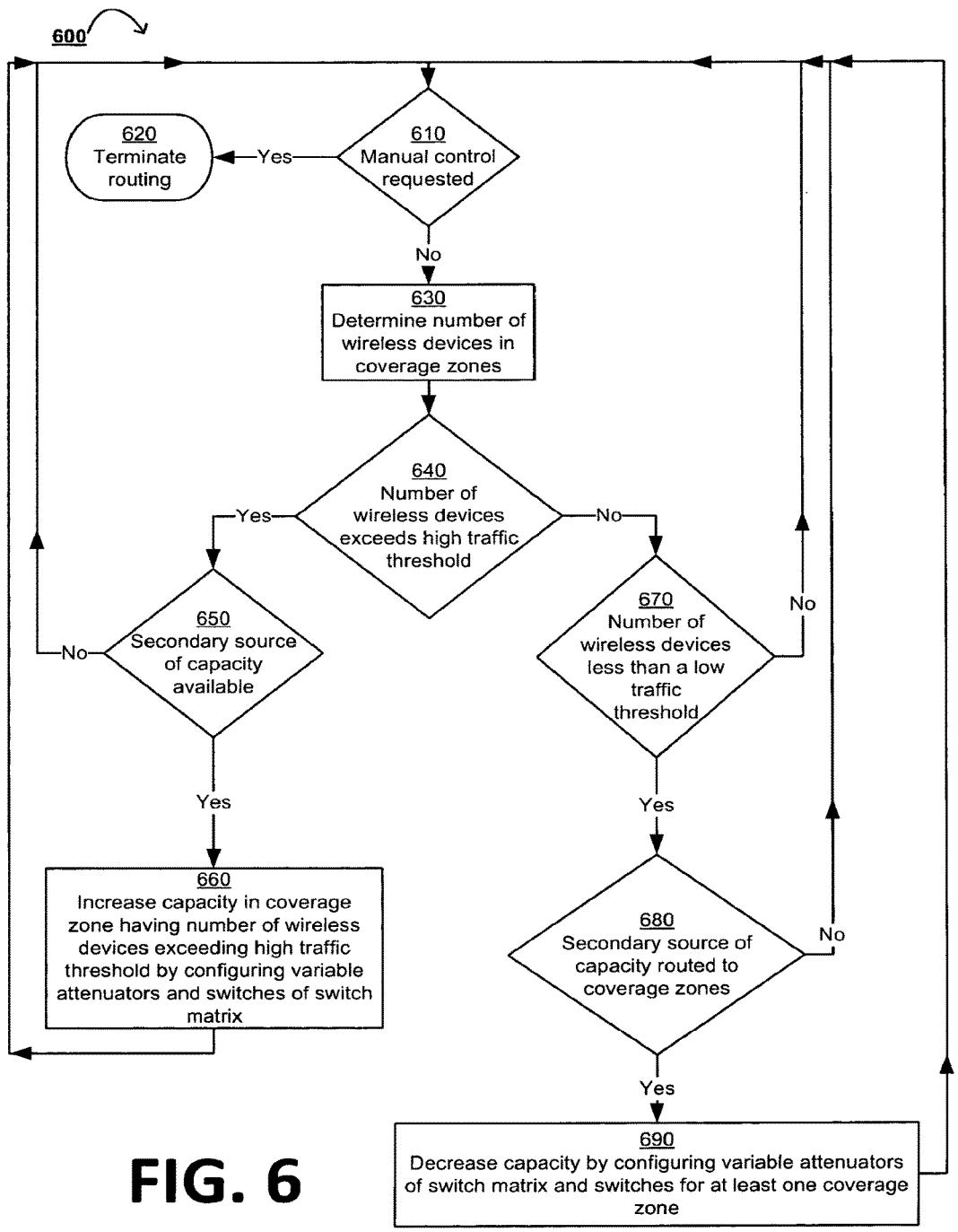
FIG. 6 is a flow chart illustrating a process for optimizing capacity in a distributed antenna system according to one aspect.

FIG. 6 depicts a flow chart illustrating a process 600 for optimizing capacity in a DAS 100. The process 600 is described with reference to the DAS 100 depicted in FIG. 2 and the system implementation of the capacity optimization sub-system 103 depicted in FIGS. 3-5. Other implementations, however, are possible.

At block 610, the controller 204 can determine whether manual control of the capacity optimization sub-system 103 is enabled. The capacity management engine 510 can determine whether manual control of the capacity optimization sub-system 103 is enabled based on data received via the I/O interface 508.

If manual control is enabled, the process 600 terminates at block 620.

If manual control is not enabled, the controller 204 can determine the number of wireless devices is determined at block 630. In the block 630, the process 600 acquires the number of wireless devices in one or more coverage zones.

At block 640, the controller 204 can determine whether the number of wireless devices exceeds a threshold corresponding to a high traffic threshold. The processor 502 can execute the capacity management engine 510 to determine if the threshold corresponding to the high traffic threshold is exceeded. In some aspects, the capacity management engine 510 can configure the controller 204 to request data identifying the respective number of wireless devices for the respective coverage zone from at least one remote antenna unit in each coverage zone that includes a signal detection device. The capacity management engine 510 can compare the data identifying the number of wireless devices in the respective coverage zone to a maximum number of wireless devices. The maximum number of wireless devices can be stored in the memory 504. In other aspects, the processor 502 can execute a scheduling algorithm of the capacity management engine 510 to determine whether the number of wireless devices in the one or more coverage zones exceeds the threshold corresponding to a high traffic level. The scheduling algorithm can identify one or more time periods associated with increasing capacity for the one or more coverage zones.

If the number of wireless devices exceeds a threshold corresponding to a high traffic threshold, the controller 204 can determine whether a secondary source of capacity is available at block 650. A secondary source of capacity can include additional sectors from one or more of the base stations 102*a*-*n* that are available for redistribution to coverage zones in which the number of wireless devices exceeds a threshold corresponding to a high traffic threshold.

If a secondary source of capacity is not available, the process 600 can return to block 610. If a secondary source of capacity is available, the controller 204 can increase capacity to at least one coverage zone having number of wireless devices exceeds a threshold corresponding to a high traffic threshold by configuring one or more of the variable attenuators 404*a*-*d* and one or more corresponding switches 402 of the switching module 304 at block 660. The process 600 can return to block 610.

If the number of wireless devices does not exceed a threshold corresponding to a high traffic threshold, the controller 204 can determine whether a number of wireless devices in at least one coverage zone is less than a threshold corresponding to a low traffic level at block 670. If the number of wireless devices in at least one coverage zone is not less than a threshold corresponding to a low traffic level, the process 600 can return to block 610. If the number of wireless devices in at least one coverage zone is less than a threshold corresponding to a low traffic level, the controller 204 can determine a secondary source of capacity is being routed to the coverage zones having a number of wireless devices that is less than a threshold corresponding to a low traffic level at block 680.

If a secondary source of capacity is not being routed to the coverage zones having a number of wireless devices that is less than a threshold corresponding to a low traffic level, the process 600 can return to block 610.

If a secondary source of capacity is being routed to the coverage zones having a number of wireless devices that is less than a threshold corresponding to a low traffic level, the controller 204 can decrease capacity to the coverage zones having a number of wireless devices that is less than a threshold by configuring one or more of the variable attenuators 404*a*-*d* and one or more corresponding switches 402 of the switching module 304 at block 690. The process 600 can return to block 610.

The foregoing description of the aspects, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A capacity optimization sub-system for distributing capacity in a distributed antenna system, the capacity optimization sub-system comprising:
    a switch matrix having a plurality of switches, the switch matrix configured to receive a plurality of sectors from a plurality of base stations and to route the plurality of sectors to a plurality of coverage zones, wherein the switch matrix is communicatively coupled to a plurality of remote antenna units providing service to the plurality of coverage zones;
    wherein the switch matrix is configured to enable one or more switches of the plurality of switches to be adjusted, wherein adjusting the one or more switches of the plurality of switches redistributes capacity of at least one base station of the plurality of base stations among the plurality of coverage zones;
    wherein the capacity optimization sub-system is configured to be operated in a manual control mode.

2. The capacity optimization sub-system of claim 1, wherein the switch matrix further comprises a plurality of variable attenuators, wherein the switch matrix is further configured to enable one or more of variable attenuators of the plurality of variable attenuators corresponding to one or more corresponding switches of the plurality of switches to be adjusted, wherein adjusting the one or more of variable attenuators of the plurality of variable attenuators and the one or more corresponding switches of the plurality of switches redistributes capacity of at least one base station of the plurality of base stations among the plurality of coverage zones.

3. The capacity optimization sub-system of claim 2, wherein the one or more variable attenuators of the plurality of variable attenuators and the one or more corresponding switches of the plurality of switches are configurable to decrease capacity in a first coverage zone of the plurality of coverage zones by attenuating signals being provided from a first source of capacity to one or more wireless devices in the first coverage zone, wherein a rate of attenuating the signals is selected to induce the one or more wireless devices of the plurality of coverage zones to switch to a second source of capacity.

4. The capacity optimization sub-system of claim 2, wherein the one or more variable attenuators of the plurality of variable attenuators and the one or more corresponding switches of the plurality of switches are configurable to increase capacity in a first coverage zone of the plurality of coverage zones by reducing attenuation of the signals being provided from a first source of capacity to one or more wireless devices in the first coverage zone of the plurality of coverage zones.

5. The capacity optimization sub-system of claim 1, wherein the one or more switches of the plurality of switches are adjusted based on a scheduling algorithm.

6. The capacity optimization sub-system of claim 1, wherein the one or more switches of the plurality of switches are adjusted based on data from one or more remote antenna units servicing the plurality of coverage zones, wherein at least one remote antenna unit in each coverage zone comprises a signal detection device.

7. The capacity optimization sub-system of claim 6, wherein the signal detection device comprises an uplink signal sniffer or a frequency scanner.

8. The capacity optimization sub-system of claim 1, wherein the switch matrix is disposed in an intelligent point-of-interface system.

9. A distributed antenna system comprising:
    a plurality of remote antenna units configured to provide service to a plurality of coverage zones; and
    a switch matrix having a plurality of switches, the switch matrix configured to receive a plurality of sectors from a plurality of base stations and to provide the plurality of sectors to the plurality of coverage zones, wherein the switch matrix is communicatively coupled to the plurality of remote antenna units providing service to the plurality of coverage zones;

wherein one or more switches of the plurality of switches are configurable to redistribute capacity among the plurality of coverage zones;

wherein the switch matrix is configured to be operated in a manual control mode.

10. The distributed antenna system of claim 9, wherein the switch matrix further comprises a plurality of variable attenuators, wherein one or more variable attenuators of the plurality of variable attenuators and one or more corresponding switches of the plurality of switches are configurable to redistribute capacity among the plurality of coverage zones.

11. The distributed antenna system of claim 10, wherein the one or more variable attenuators of the plurality of variable attenuators and the one or more corresponding switches of the plurality of switches are configurable to decrease capacity in a first set of coverage zones of the plurality of coverage zones by attenuating signals being provided from a first source of capacity to one or more wireless devices in the first set of coverage zones, wherein a rate of attenuating the signals is selected to induce the one or more wireless devices to switch to a second source of capacity;

wherein the one or more variable attenuators of the plurality of variable attenuators and the one or more corresponding switches of the plurality of switches are configurable to increase capacity in a second set of coverage zones by reducing attenuation of the signals being provided from the first source of capacity to one or more wireless devices in the second set of coverage zones.

12. The distributed antenna system of claim 9, wherein the one or more switches of the plurality of switches are configurable based on data from one or more remote antenna units of the plurality of remote antenna units servicing the plurality of coverage zones.

13. The distributed antenna system of claim 9, wherein at least one remote antenna unit in each set of coverage zones comprises a signal detection device, wherein the signal detection device comprises an uplink signal sniffer or a frequency scanner.

14. The distributed antenna system of claim 9, wherein the one or more switches of the plurality of switches are configurable based on a scheduling algorithm.

15. A method for optimizing capacity in a distributed antenna system, the method comprising:

receiving, at a switch matrix, a plurality of sectors from a plurality of base stations, wherein the switch matrix comprises a plurality of switches;

providing the plurality of sectors to a plurality of remote antenna units configured to provide service to a plurality of coverage zones; and redistributing capacity among the plurality of coverage zones by manually configuring one or more corresponding switches of the plurality of switches.

16. The method of claim 15, wherein the switch matrix further comprises a plurality of variable attenuators, the method further comprising redistributing capacity among the plurality of coverage zones by manually configuring one or more variable attenuators of the plurality of variable attenuators corresponding to the one or more corresponding switches of the plurality of switches.

17. The method of claim 16, wherein redistributing capacity among the plurality of coverage zones comprises:

decreasing capacity in a first coverage zone by attenuating signals from a first source of capacity in the first coverage zone at a rate sufficient to induce one or more wireless devices in the first coverage zone to switch from the first source of capacity to a second source of capacity; and increasing capacity in a second coverage zone by reducing an attenuation of signals from the first source of capacity in the second coverage zone.

18. The method of claim 15, further comprising redistributing capacity among the plurality of coverage zones based on a scheduling algorithm.

19. The method of claim 15, further comprising redistributing capacity among the plurality of coverage zones based on data from one or more remote antenna units of the plurality of remote antenna units servicing the plurality of coverage zones, wherein at least one remote antenna unit in each coverage zone comprises a signal detection device.

20. The method of claim 19, wherein the signal detection device comprises an uplink signal sniffer or a frequency scanner.

* * * * *